April 30, 1929.  K. K. WRIGHT  1,710,758
FILTER
Filed Sept. 18, 1925  3 Sheets-Sheet 2

INVENTOR
Kirk K. Wright,
By
Parker & Brochnow
ATTORNEYS

April 30, 1929.  K. K. WRIGHT  1,710,758
FILTER
Filed Sept. 18, 1925   3 Sheets-Sheet 3
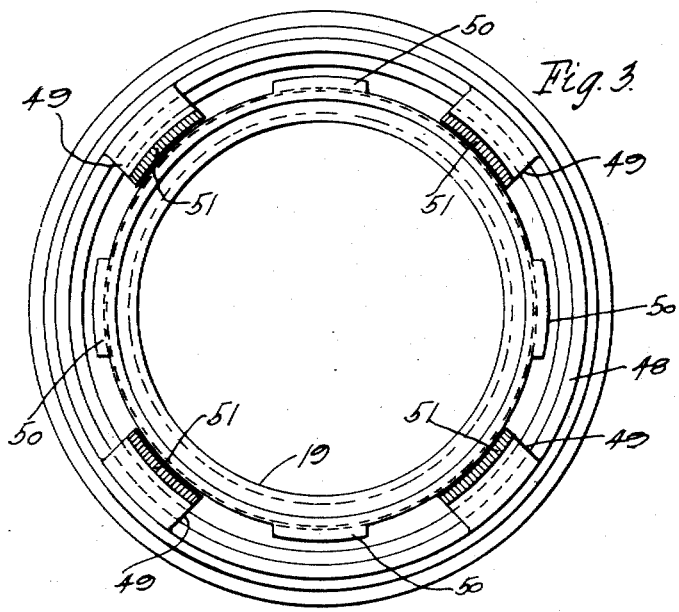
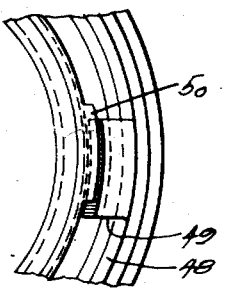
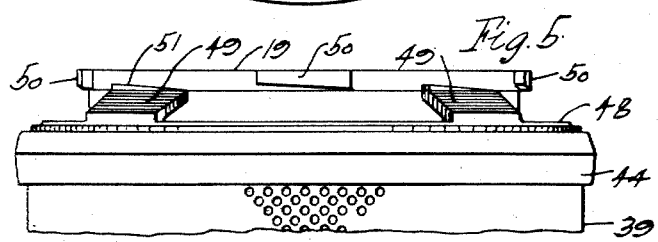
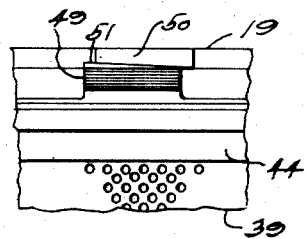
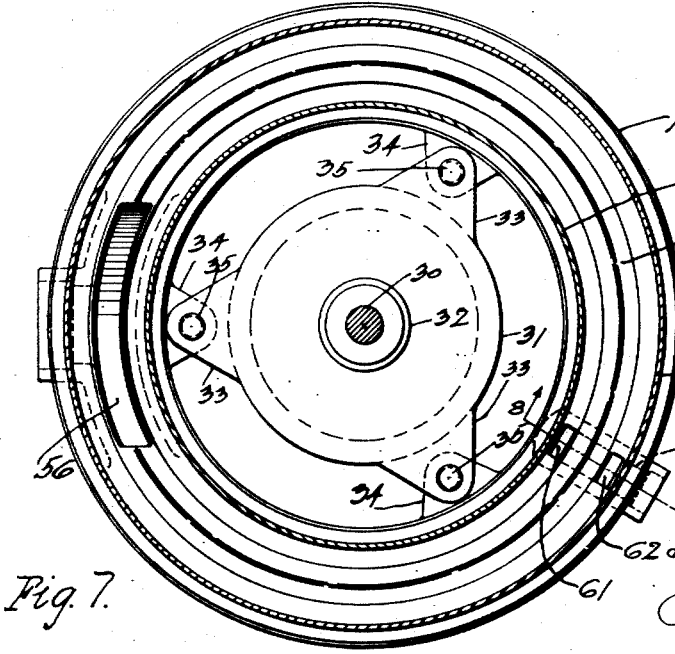
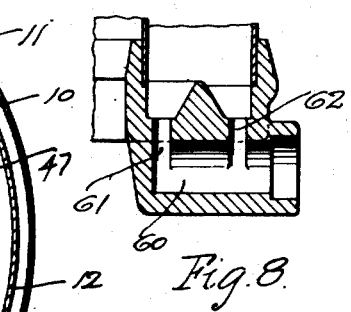
INVENTOR
Kirk K. Wright,
By Parker & Prochnow
ATTORNEYS Patented Apr. 30, 1929.

1,710,758

UNITED STATES PATENT OFFICE.

KIRK K. WRIGHT, OF BUFFALO, NEW YORK.

FILTER.

Application filed September 18, 1925. Serial No. 57,114.

This invention relates to filters of the kind in which liquid passes through a substantially upright, removable filter cloth or member which is generally cylindrical in form.

The objects of this invention are to provide a filter of this kind of improved construction, in which the liquid to be filtered is supplied between two filter members and passes through both of these members; also to provide a filter of this kind having a large filtering area and consequently large capacity for a given size; also to provide a filter of this kind, of improved construction, in which all parts are readily accessible for cleaning when the filter is taken apart; also to provide a filter of this kind with means of improved construction for securing the several parts of the filter into their operative positions and for readily disassembling the filter for purposes of cleaning the same; also to improve the construction of filters of this kind in other respects hereinafter specified.

In the accompanying drawings:

Fig. 3 is a top plan view on a reduced scale, of the connections for clamping or securing the filter members in their operative positions, the clamping member being shown out of engagement with its cooperating part.

Fig. 4 is a fragmentary plan view, similar to Fig. 3, except that the clamping member is shown turned into its clamping position.

Fig. 5 is an elevation of the upper ends of the filter members showing the clamping part in released or unclamped position, as shown in Fig. 3.

Fig. 6 is a similar fragmentary elevation showing the clamping parts in their operative or clamping positions.

Fig. 7 is a sectional, top, plan view of the lower portion of the filter, the section being taken on line 7—7, Fig. 2.

Fig. 8 is a fragmentary sectional elevation thereof on line 8—8, Fig. 7.

Figure 1:
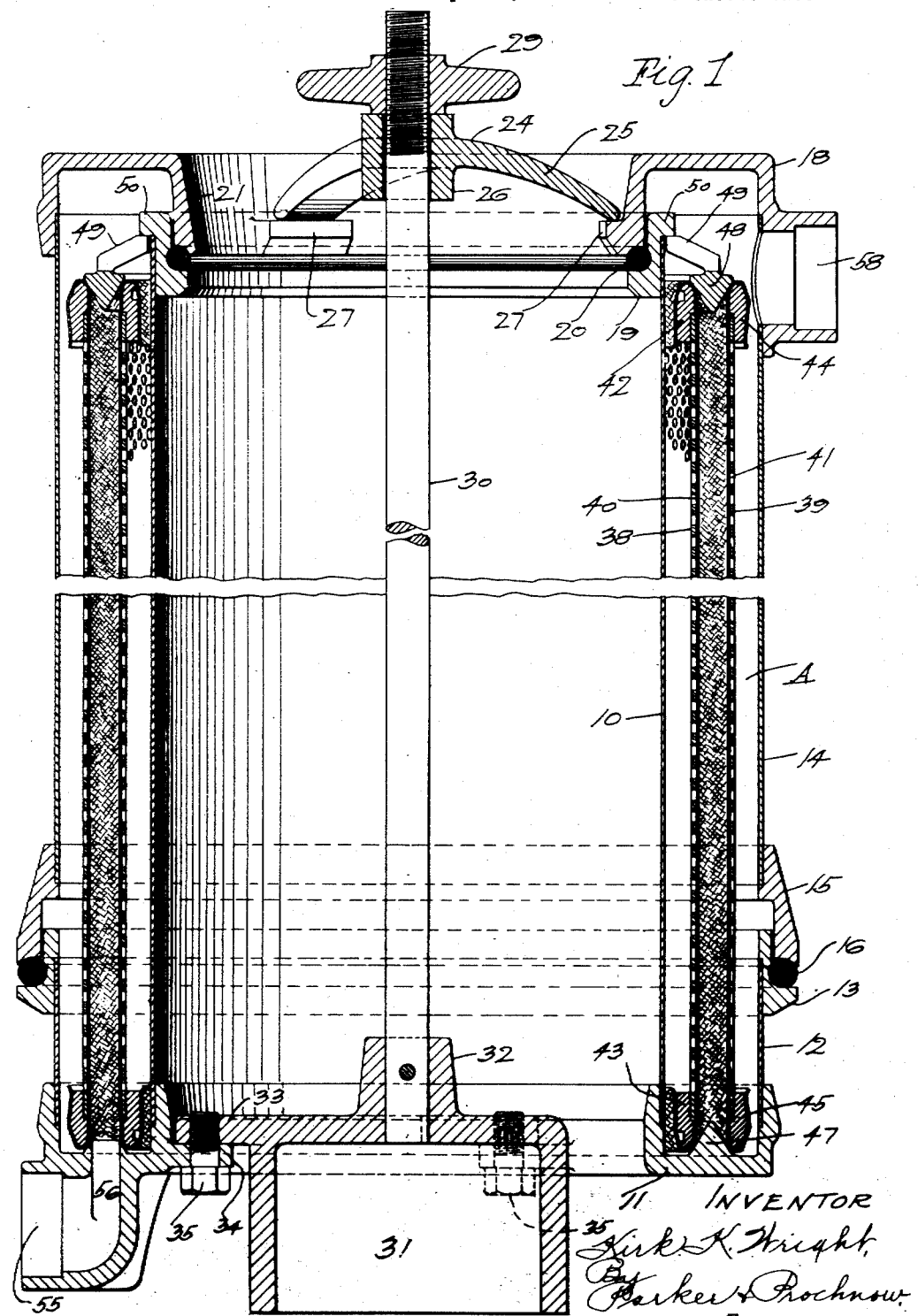
Fig. 1 is a central sectional elevation of a filter embodying my invention, showing the parts in their assembled or operative positions.
Figure 2:
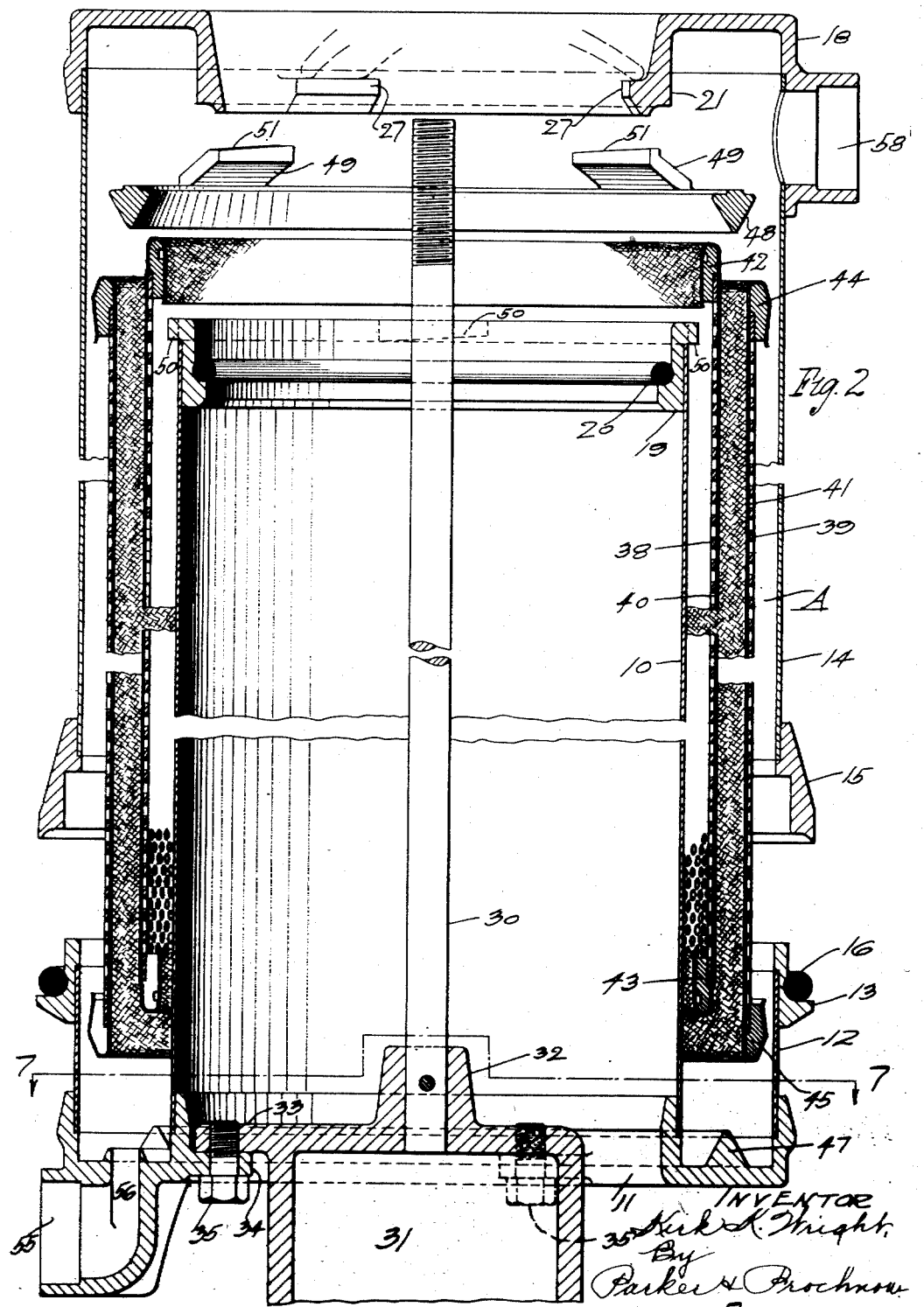
Fig. 2 is a similar view thereof showing the parts separated or disconnected from each other, the clamping means for the top of the filter chamber being omitted.

The accompanying drawings show, by way of example, one embodiment of my invention, in which an annular filter chamber A is provided, within which the liquid is filtered, this chamber being formed by an inner cylindrical wall 10, the lower end of which is permanently secured to a base 11, which may also be annular in form, as shown, and an outer cylindrical wall portion 12, also secured to the annular base 11 and provided at its upper end with a flange ring 13. The upper portion of the outer wall of the filter chamber A is removable, and includes a wall portion 14 terminating at its lower end in a flange ring 15 adapted to cooperate in any suitable manner with the ring 13 to form a tight joint, an annular packing member or ring 16 being shown in the construction illustrated, which is clamped between the two flange rings 13 and 15. The upper portion 14 of the outer wall of the filter chamber A is secured to a top member 18, which is also annular in form and which is adapted to form a seal with the upper end of the inner cylindrical wall 10 of the filter chamber A. For this purpose the inner cylindrical wall 10 is provided at its upper end with a flange ring 19, and a flexible gasket 20 is interposed between this flange ring and a downwardly extending flange 21 of the top member 18 of the filter.

It will be evident from this construction that if the downward pressure is applied to the top 18 of the filter, the two packing rings 16 and 20 will be compressed so that tight joints are simultaneously formed at both of these rings. Any suitable or desired means for pressing this head downwardly to assemble the parts of a filter chamber A may be provided. In the particular construction shown, a clamping head or spider 24 is provided having a plurality of arms 25, three being indicated in the construction shown, and which extend outwardly from a hub portion 26. The ends of the arms are adapted to engage with inwardly projecting parts or lugs 27 formed in the inner edge of the top 18 of the filter. Downward pressure may be exerted on the spider 24 by means of a hand nut 29 having threaded engagement with the threaded end of a stem 30 which is secured to and extends upwardly from a supporting member 31 through the space within the inner wall 10 of the filter chamber A.

The supporting member 31 may be of any suitable or desired construction, that shown being provided with a central hub portion 32 in which the central rod 30 may be secured, and the base 11 of the filter may be supported on the supporting member 31 in any suitable manner. In the particular construction shown, the supporting member 31 is provided with outwardly extending lugs or projecting parts 33, three of these lugs being shown in the construction illustrated, see particularly Fig. 7, and the annular base 11 is provided with a corresponding number of inwardly extending projecting parts or lugs 34, and the lugs of the supporting member and of the annular base 11 of the filter may be secured together in any suitable manner, such, for example, as by bolts or screws 35 passing through holes in the lugs. By means of this construction the space within the inner wall 10 of the filter chamber is open at the top and bottom, so that no liquid or other material can accumulate in this space, and this space can be readily cleaned, which is a particularly desirable feature if the filter is used for filtering milk. A base and supporting member of any other suitable construction may, however, be employed, if desired.

Within the filtering chamber A are arranged two substantially concentric screens or perforated plates 38 and 39, of substantially cylindrical form, and which serve mainly for the purpose of securing a pair of tubular filter cloths 40 and 41 in their correct operative positions within the filter chamber. In the construction shown, the filter cloth 40 is arranged on the outer surface of the inner cylindrical screen 38, and the filter cloth 41 is arranged on the inner surface of the outer cylindrical screen 39, so that when milk or other liquid to be filtered is admitted into the space between the filter cloths, the liquid can pass through both of the two filter cloths, thus producing a filter of large capacity.

In order to secure the ends of the filter cloths in such a manner as to prevent the liquid to be filtered from escaping beyond the ends of the filter cloths, the cylindrical screen members 38 and 39 are preferably provided at their ends with rings over which the end portions of the filter cloths may pass, the inner perforated or screen member 38 being provided at its upper and lower ends respectively with rings 42 and 43, and the outer screen member 39 being provided with similar rings 44 and 45 respectively at the upper and lower ends thereof. In order to form a tight joint with the annular bottom member 11 of the filter chamber, an upwardly extending wedge-shaped projection 47 is preferably provided which may be formed integral with the annular base 11, and extends upwardly from the base into the space between the two lower rings 43 and 45, so that the filter cloths 40 and 41 may be held or pinched between the inclined faces of the wedge-shaped projection 47 and the rings 43 and 45. In a similar manner, the two upper rings 42 and 44 are adapted to be engaged with the inclined sides of a ring 48 of wedge-shaped cross section. The ring 48 and the wedge-shaped projection 47 serve the two-fold purpose of holding the filter cloths in place on the screen member, and also with the aid of the filter cloths, form a tight joint at the ends of the screen members, which prevents the escape of liquid to be filtered at the ends of these members.

Means of any suitable construction may be provided for compressing the wedge-shaped members 47 and 48 against the ends of the perforated cylindrical members, and for this purpose, in the construction shown, the upper wedge-shaped member or ring 48 is provided with a plurality of inwardly extending arms 49, which are adapted to engage with outwardly projecting portions 50 arranged on the ring 19 forming the top of the inner wall 10 of the filter chamber A. The lower faces of these projections 50 are inclined, as is clearly shown in Figs. 5 and 6, and consequently, by turning the ring 48, inclined faces 51 at the ends of the arms 49 will engage with the inclined lower faces of the projections 50, by means of which the ring 48 may be pressed downwardly to form a tight joint with the upper ends or flange rings of the cylindrical perforated members 38 and 39, and at the same time press these members down into engagement with the inclined faces of the wedge-shaped projection 47 of the annular bottom member 11.

The admission of liquid to be filtered into the space between the two filter cloths may be accomplished by means of an inlet opening or connection 55, which may be made integral with the annular bottom member 11, and which may be formed in any suitable way (not shown) for attachment with a supply tube through which the liquid to be filtered may pass to the machine. The inlet connection 55 is provided with an arc-shaped passage 56, the upper or discharge end of which terminates in the upper portion of the annular projection 47 of the bottom member 11. In order to provide for the discharge of liquid from the filter, the top or cap member 18 of the filter, in the particular construction shown, is provided with a discharge connection 58, which may, if desired, be formed as a part of the top 18 of the filter, and through which the filtered liquid may be discharged from the apparatus.

In the operation of the filter, the liquid supplied through the inlet 55 flows through the passage 56 into the space between the filter cloths, then passes through the filter cloths, part of the liquid flowing through one of the filter cloths, and part through the other filter cloth. As the filtered liquid between the cloth 41 and the outer wall 14 of the filter chamber reaches the level of the discharge opening 58, it will be discharged from the apparatus, and the liquid passing through the filter cloth 42 will flow over the top of the ring 48 into the space drained by the discharge opening 58, the space in the cap or top 18 of the filter above the discharge opening 58 forming an air space or cushion. By means of the arrangement described, my improved filter has practically twice the filtering capacity that has heretofore been obtained by filters using only a single filtering cloth. It will be understood that liquid may be filtered by passing the same through the filter cloths in the opposite direction, using the passage 58 as the inlet and the passage 58 as the outlet.

In order to permit the liquid which has been filtered, and which is below the level of the discharge opening in the filter, to be drained after the filtering is completed, a drain connection is preferably provided in the base of the filter. For this purpose a drain passage 60 is preferably provided which may be formed integral with the annular base of the apparatus, and which is shown in Figs. 7 and 8. This passage preferably terminates in a valve or plug (not shown) and also has two branches or passages 61 and 62 connecting therewith, the passage 61 terminating in the space between the inner filter cloth and the inner wall 10 of the filter chamber, and the other passage 62 terminating in the space between the outer filter cloth 41 and the outer wall of the filter chamber. Other means for draining these two spaces of the filter chamber may be provided, if desired.

In taking the filter apart, the hand screw 29 is turned just sufficiently to release the pressure on the spider 24, whereupon the spider is turned through a small part of a revolution to release the legs or arms 25 thereof from engagement with the projections 27, whereupon the top or cap 18 of the filter, together with the portion 14 of the outer side wall, may be raised and removed from the remainder of the filter. By turning the ring 48 through a small part of a revolution to disengage the arms 49 from the projections 50, this ring 48 and the two cylindrical perforated members 38 and 39, as well as the filter cloths, may be removed from the filter. This leaves the outer periphery of the cylindrical wall 10 exposed for cleaning, and the short outer wall 12, as well as the interior of the bottom ring 11 of the filter can be readily reached for purposes of cleaning. By forming the outer wall of the filter chamber in two sections, the lower one of which is secured to the base, a permanent, annular receptacle is formed at the lower portion of the filter chamber, in which any milk or other liquid remaining in the filter after draining the same, is collected, so that the liquid will not be spilled on the floor when the filter is taken apart.

The filter is of simple construction and can be readily assembled or dismantled, and all of the parts of the filter which come in contact with material to be filtered are readily accessible for cleaning, which is of particular importance when the filter is used in connection with the filtering of milk or the like.

I claim as my invention:

1. In a filter, the combination of a filter chamber, a pair of filter cloths in said chamber arranged one within the other to form between them a hollow cylindrical space, means for supporting said cloths in their operative positions, and means for directing liquid through said chamber in such a manner that a part of the liquid flows through one of said filter cloths and another part of the liquid flows through the other cloth.

2. In a filter, the combination of a filter chamber, a pair of screen members in said chamber arranged one within the other, tubular filter cloths supported by said screen members, one cloth being arranged on the inner face of a screen member and the other being arranged on the outer face of the other screen member, and liquid inlet and outlet passages terminating in said chamber and arranged so as to cause a part of the liquid to be filtered to pass through one of said cloths and the other part of the liquid to pass through the other cloth.

3. In a filter, the combination of a hollow cylindrical filter chamber having inner and outer walls, means for closing the upper and lower ends of said chamber, a pair of cylindrical filter cloths arranged substantially concentrically in said chamber, means cooperating with one of said walls for holding said cloths in their operative positions, and means for supplying liquid to be filtered to such portions of said chamber as to cause the liquid being divided and a part thereof to pass through each of said cloths.

4. In a filter, the combination of a filter chamber, a pair of substantially concentrically arranged filter cloths in said chamber, means for supporting said cloths in their operative positions to form a substantially hollow cylindrical space between said cloths, means for closing the opposite ends of said space, means for supplying liquid into the space between said cloths, and means for collecting liquid which has passed through said cloths and discharging the same from said chamber.

5. In a filter, the combination of a filter chamber, a pair of substantially concentrically arranged screen members in said chamber, tubular filter cloths supported by said screen members, means for engaging the upper and lower ends of said screen members and said filter cloths, which means serve to hold said cloths in operative positions and to close the spaces between said filter cloths, and a liquid passage terminating in the space between said cloths.

6. In a filter, the combination of a filter chamber, a pair of substantially concentrically arranged screen members in said chamber, tubular filter cloths supported by said screen members, a pair of annular members having inclined faces adapted to engage the ends of said screen members and cloths and to close the ends of the space between said filter cloths, and a passage for liquid terminating in said space.

7. In a filter, the combination of a filter chamber, a pair of substantially concentrically arranged screen members in said chamber, tubular filter cloths supported by said screen members, a pair of annular members having inclined faces adapted to engage the ends of said screen members and cloths and to close the ends of the space between said filter cloths, means for moving one of said annular members toward the other member to form a wedging connection between said inclined faces and said cloths and screen members, and a passage terminating in said space between said cloths.

8. In a filter, the combination of a filter chamber having inner and outer cylindrical walls, a pair of substantially concentrically arranged screen members in said chamber, tubular filter cloths supported by said screen members, the ends of said filter cloths extending around the ends of said screen members, an annular clamping member engaging the ends of said filter cloths to press the same against the upper ends of said screen members and to press said screen members against the bottom of said filter chamber to form tight joints at the ends of the space between said filter cloths, means cooperating with one of said cylindrical walls and said annular clamping member to releasably press said annular member into its operative position, and a passage for liquid terminating in the space between said filter cloths.

9. In a filter, the combination of a filter chamber having inner and outer cylindrical walls, a pair of substantially concentrically arranged screen members in said chamber, tubular filter cloths supported by said screen members, the ends of said filter cloths extending around the ends of said screen members, an annular clamping member engaging the ends of said filter cloths to press the same against the upper ends of said screen members and to press said screen members against the bottom of said filter chamber to form tight joints at the ends of the space between said filter cloths, means for releasably pressing said annular member against the upper portion of said filter cloths to form tight joints at the opposite ends of said cloths, and a passage for liquid terminating in the space between said filter cloths, said annular member being arranged below the upper end of said filter chamber to permit liquid in said filter chamber and outside of the space between said filter cloths to flow over said annular member.

10. In a filter, the combination of a filter chamber, a pair of filter cloths in said chamber arranged one within the other, means for supporting said cloths in their operative positions, means for closing the ends of the space between said cloths, a liquid passage terminating in the space between said cloths, another liquid space terminating in said filter chamber outside of said space between said cloths, and means for permitting liquid to flow in said filter chamber from one side of said filter cloths to the other side thereof.

11. In a filter, the combination of a filter chamber, a pair of concentrically arranged screen members in said chamber, tubular filter cloths supported by said screen members and overlapping the ends of said screen members, inclined faces on the bottom wall of said filter chamber with which said filter cloths are adapted to engage, an annular member engaging the upper ends of said filter cloths and adapted to press downwardly on said filter cloths and screen members to form tight joints at the opposite ends of said screen members, and a liquid passage terminating in the space between said filter cloths.

12. In a filter, the combination of a filter chamber, a pair of concentrically arranged screen members in said chamber, tubular filter cloths supported by said screen members and overlapping the ends of said screen members, inclined faces on the bottom wall of said filter chamber with which said filter cloths are adapted to engage, an annular member engaging the upper ends of said filter cloths and adapted to press downwardly on said filter cloths and screen members to form tight joints at the opposite ends of said screen members, and a liquid passage in the bottom of said chamber terminating in the space between said inclined faces and communicating with the space between said filter cloths.

13. A filter having a hollow cylindrical filter chamber including a base having a cylindrical wall secured thereto and forming the inner wall of said filter chamber, a support on which said base is mounted, a top member having secured thereto a cylindrical wall forming an outer wall of said chamber, said top member also forming a seal with said inner wall, and clamping means for pressing said top member towards said base, said means including a part extending upwardly from said supporting member and into the space enclosed by said inner wall.

14. A filter having a hollow cylindrical filter chamber and including an annular base having a cylindrical wall secured thereto which forms the inner wall of said filter chamber, a supporting member having a series of projections connected to said annular base to support the same without enclosing the lower end of the space surrounded by said inner wall, a top member having a cylindrical wall secured thereto which forms the outer wall of said filter chamber, and clamping means for pressing said top member downwardly against said inner cylindrical wall, said clamping means being formed to leave an opening at the upper end of the space enclosed by said inner cylindrical wall.

15. A filter having a hollow cylindrical filter chamber and including an annular base having a cylindrical wall secured thereto which forms the inner wall of said filter chamber, a supporting member having a series of projections connected to said annular base to support the same without enclosing the lower end of the space surrounded by said inner wall, a top member having a cylindrical wall secured thereto which forms the outer wall of said filter chamber, and a clamping member having radial arms engaging said top member, and a part extending upwardly from said supporting member and adapted to cooperate with said clamping member for holding the same in clamping engagement with said top member.

16. A filter having a filter chamber including a base, a pair of filter cloths arranged one within the other in said filter chamber, a passage for liquid terminating in the space between said filter cloths, another passage above said base communicating with the other sides of said filter cloths, and a drain passage in said base closed during the operation of said filter and having branches terminating in said filter chamber at said other sides of said filter cloths for draining liquid from said filter chamber.

17. A filter having a hollow cylindrical filter chamber including a base, a pair of substantially concentrically arranged filter cloths in said filter chamber and spaced apart to form a space for liquid and having a liquid tight connection with said base, a passage in said base terminating in the space between said filter cloths, another passage above said base communicating with the other sides of said filter cloths, and a normally closed drain passage in said base having branches which terminate in said filter chamber at said other sides of said filter cloths for draining liquid from said filter chamber.

KIRK K. WRIGHT.